Oct. 20, 1953 W. H. CHERRY 2,656,466

CAPACITOR AND CIRCUIT

Filed Aug. 27, 1949

INVENTOR
William H. Cherry
BY Harry Tunick
ATTORNEY

Patented Oct. 20, 1953 2,656,466

UNITED STATES PATENT OFFICE 2,656,466

CAPACITOR AND CIRCUIT

William H. Cherry, Princeton, N. J., assignor to Radio Corporation of America, a corporation of Delaware Application August 27, 1949, Serial No. 112,818

10 Claims. (Cl. 250—36)

This invention relates to capacitors, and more particularly to an electronically-variable capacitor and a circuit utilizing the same.

An object of this invention is to provide an electronically-variable capacitor of rapid response.

Another object is to devise an electronically-variable capacitor which provides a large range of capacitance variation.

Another object is to devise an electronically-variable capacitor by which the frequency of an electronic oscillator may be altered or controlled.

A further object is to provide a novel and effective automatic frequency-control circuit.

A still further object is to devise an automatic frequency-control circuit which is capable of use for controlling the frequency of a local oscillator in television and frequency modulation receivers, as well as in amplitude modulation receivers.

The foregoing and other objects of the invention will be best understood from the following description of some exemplifications thereof, reference being had to the accompanying drawing, wherein.

Figure 3:
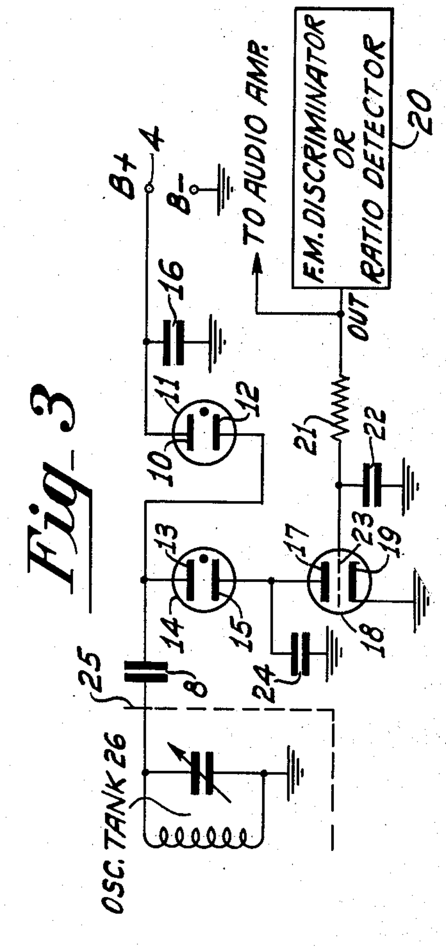
Fig. 3 is an AFC circuit utilizing an arrangement somewhat similar to Fig. 2.

The objects of this invention are accomplished, briefly, in the following manner:

At high frequencies, the electrostatic capacitance existing between the electrodes of a gaseous discharge tube, either of the cold cathode glow, hot cathode arc, or other gaseous discharge type, when no direct current is flowing therethrough is markedly changed by the presence of the discharge when direct current is flowing. By direct current is meant herein unidirectional current though variable even at audio frequency rates and faster. In glow tubes this direction may itself be reversed and the capacity variations under discussion may still be obtained. The value of this capacitance changes with changes in the value of the direct current flowing through the glow tube itself. Specifically, when the direct current flowing increases, the capacitance increases, and the capacitance decreases when such current decreases. By connecting the electrodes of a glow discharge tube in a direct current circuit the current flow in which circuit is controlled by a control voltage derived in turn from a suitable condition-responsive network, the capacitance between such electrodes is varied by such control voltage and this variable capacitance is in turn utilized to control the frequency of an oscillator. If the condition-responsive network produces a control voltage in dependence upon the amount of mistuning of the oscillator, the arrangement of this invention provides an AFC system for the oscillator.

At sufficiently high frequencies, the plasma of a gas discharge does not behave as at low frequencies, as a conducting medium, but exhibits both capacitive and inductive effects, depending upon the frequency, these effects being presumably attributable to the relative motions of the space charge forming electrons and the space charge neutralizing ions in the discharge. Therefore, at high frequencies, the electrostatic capacitance existing between the electrodes of a glow discharge tube when no direct current is flowing therethrough is markedly changed by the presence of the discharge when direct current is flowing. This effect has been measured on an OB2 voltage regulator glow discharge tube and capacitance variations of more than two to one have been observed when the direct current is varied from minimum to rated maximum for the discharge tube. Similar measurements have been made on many other discharge tubes, notably the NE17 neon glow tube.

Moreover, by changes in the density of the particles constituting the main plasma of the glow discharge, in other words, of the positive ions and negative electrons, corresponding changes or variations in R. F. capacitance between the main electrodes of the glow discharge are produced. These changes in the density of the particles constituting the main plasma are produced by varying the entire glow discharge current. In other words, changes in the direct current of the glow discharge produce corresponding changes in the dielectric constant of the main plasma, and corresponding changes in the capacitance between the two main electrodes of the glow discharge tube; when the glow discharge takes place in a conventional two-electrode glow tube, these changes in R. F. capacitance will take place between the two electrodes of the tube. Therefore, relatively inexpensive two-electrode glow tubes may be used for the purposes of this invention, tubes having auxiliary electrodes not being required. When the direct current flowing increases, the capacitance usually increases, and the capacitance usually decreases when such current decreases.

Figure 1:
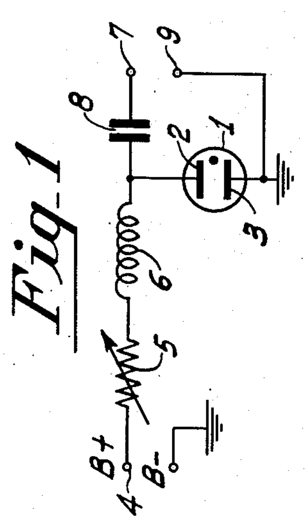
Fig. 1 is a basic circuit useful in explaining the operation of this invention.

Now referring to Fig. 1, which shows schematically a basic or elemental form of circuit for utilizing this invention, a gas discharge tube 1, which may be a type OB2 voltage regulator or other suitable glow discharge tube, has a pair of electrodes 2 and 3 therein, electrode 3 being grounded. The interelectrode space of glow discharge tube 1 is connected in series in a capacitance-controlling direct current circuit which comprises a terminal 4 connected to the positive side of a suitable source of direct current, a variable resistor 5 which functions as a current controlling element, an inductance 6 which has a high impedance at radio frequencies and isolates the direct current source from radio frequencies, electrodes 2 and 3, and ground or the negative side of the source. The direct current source has a potential which is appropriate to establish a glow discharge in tube 1, and by varying resistor 5, the glow discharge current, or the direct current in the main plasma of the glow discharge, may be varied.

According to this invention, as previously stated, this variation of the glow discharge current produces a capacitance variation between the two electrodes 2 and 3. This capacitance variation, which depends on the direct current flowing in tube 1 and which itself appears at high frequencies, may be utilized in a high frequency circuit by connecting a high frequency terminal 7 to electrode 2 through a direct current isolation condenser 8 and by connecting another high frequency terminal 9 to ground. Then, the high frequency capacitance variation, as resistor 5 is varied to vary the direct current flow, appears between terminals 7 and 9.

Figure 2:
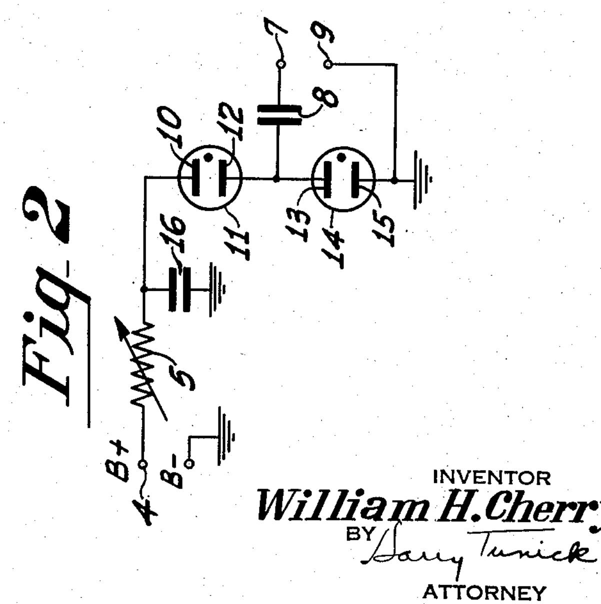
Fig. 2 is a modification of Fig. 1.

Fig. 2 shows a modification of Fig. 1 in which the variation of capacitance with direct current changes is twice as great as in Fig. 1. In Fig. 2, elements the same as those of Fig. 1 are denoted by the same reference numerals. In Fig. 2, the path for the flow of capacitance-controlling direct current is as follows: positive source terminal 4, variable resistor 5, one electrode 10 of a first glow discharge tube 11, the opposite electrode 12 of tube 11, one electrode 13 of a second glow discharge tube 14, and the opposite electrode 15 of tube 14 to ground and the negative side of the source. Thus, the direct current flows through two separate glow discharge paths in Fig. 2, and therefore is effective to vary two separate high frequency capacitances in response to variation of resistor 5, rather than only one as in Fig. 1. No inductance, resistance or other high frequency separating elements, such as 6 in Fig. 1, are needed in this case.

Electrode 10 is grounded for high frequencies by a suitable condenser 16. Therefore, the net or effective high frequency capacitance between terminal 7 and ground or terminal 9 (electrode 15 being grounded directly as illustrated) consists of two variable capacitances in parallel, one being the plasma of tube 11 and the other the plasma of tube 14. Both of these capacitances are variable by the variation of direct current flow in the series direct current path through both tubes, and since capacitances in parallel add to give the total over all capacitance, the variation of the high frequency capacitance between terminals 7 and 9 with variation in direct current is twice as great in Fig. 2 as in Fig. 1. A direct current isolation condenser 8 is connected between terminals 7 and the directly-connected electrodes 12 and 13.

Fig. 3 illustrates the application of the concept of this invention as disclosed in Fig. 2 to an AFC circuit for automatically controlling the frequency of a local oscillator in a television sound receiver or in a frequency modulation receiver. The path for the flow of capacitance-controlling direct current is as follows: positive terminal 4, electrode 10 of glow discharge tube 11, electrode 12 of tube 11, electrode 13 of glow discharge tube 14, electrode 15 of tube 14, anode 17 of a direct current amplifying triode 18, and cathode 19 of said triode to ground and the negative terminal of the direct current source. Since the anode-cathode path of triode 18 is in series in the direct current circuit through the glow discharge tubes 11 and 14, variation of the effective impedance of said path by variation of the potential applied to the control grid of this triode varies the amount of direct current flowing through the glow discharge tubes and correspondingly varies the net high frequency capacitance provided by such glow tubes.

A frequency modulation discriminator or ratio detector, indicated at 20 in the form of a block because it is more or less conventional, constitutes a part of the frequency modulation receiver the local oscillator frequency of which is to be automatically controlled. In the output lead of such a discriminator or ratio detector there appears, as is well known, audio frequency amplitude variations representing intelligence, and in addition a direct voltage component appears in this lead whenever the frequency modulation receiver is mistuned, that is, whenever the center or rest frequency of the heterodyned incoming signal is not exactly at the crossover point of the discriminator characteristic because of mistuning of the local oscillator in the receiver, the magnitude and polarity of said component corresponding to the degree and relative direction of mistuning of such oscillator. The output lead of unit 20 is coupled to an audio amplifier as indicated in order to apply the audio frequency amplitude variations appearing in such output lead thereto for utilization therein. The direct voltage component appearing in the output lead of unit 20 is applied, through an RC network, consisting of a series resistor 21 and a shunt condenser 22 connected from the end of resistor 21 opposite unit 20 to ground, to the control grid 23 of the triode 18. The RC network 21—22 serves as an audio filter, to filter out or bypass audio frequencies, or to prevent them from reaching the grid 23, so that the only voltage effective on such grid is the direct voltage in the output of unit 20. Triode 18 is connected to act as a direct current amplifier, to amplify the direct voltage from unit 20, the anode-cathode path of triode 18 being controlled by, or being responsive to, the direct voltage output of unit 20 applied to control grid 23. Variations of the effective impedance of anode-cathode path 17, 19 by variations of the potential applied to grid 23 produce corresponding variations of the amount of direct current flowing through the glow discharge tubes 11, 14, in turn producing corresponding variations of the net high frequency capacitance provided by such glow tubes.

Similarly to Fig. 2, the directly-connected electrodes 12 and 13 of glow tubes 11 and 14, respectively, are connected through a direct current isolation condenser 8 to a high frequency network 25, in this case consisting of the tank circuit 26 of a local oscillator in the receiver, one end of said tank circuit being grounded. As in Fig. 2, the variable high frequency capacitance, which is dependent on the amount of direct current flowing through the glow tubes 11 and 14, appears or is provided between the directly-connected electrodes 12 and 13 and ground. Electrodes 12 and 13 are connected through condenser 8 to the upper end of oscillator tank circuit 26 and the lower end of said tank circuit is grounded, so that the variable high frequency capacitance of the glow tubes is connected across or in shunt with the oscillator tank circuit 26. In order to complete the high frequency circuits including the glow tube variable capacitance to ground, electrode 10 is grounded for high frequencies by condenser 16, while electrode 15 is grounded for high frequencies by condenser 24.

In order to explain the operation of the AFC circuit of Fig. 3, let us assume that the frequency of the local oscillator has tended to drift to a higher frequency than is proper. This means that the center or rest frequency of the heterodyned incoming signal is not exactly at the crossover point of the characteristic of discriminator unit 20, and unit 20 is connected to provide a positive direct voltage component in its output lead under these conditions. This positive potential passes through the audio frequency filter 21, 22 and is applied to control grid 23, reducing the effective impedance of the anode-cathode path of triode 18 in an amplified fashion. This reduction of effective impedance of path 17, 19 reduces the total impedance of the direct current circuit including such path, increasing the flow of direct current through the glow tubes 11, 14 and increasing the high frequency capacitance between the directly-connected electrodes 12, 13 and ground. As in Fig. 2, the two glow tubes have their high frequency capacitances in shunt as regards the oscillator tank circuit 26, while their direct current paths are in series. An increase in the capacitance provided by the glow tubes, which capacitance is in shunt to the oscillator tank 26, causes a decrease in the frequency of the oscillator controlled by such tank circuit, this decrease counteracting the initially-assumed increase in local oscillator frequency and effecting automatic frequency control of such oscillator.

Conversely, when the local oscillator frequency tends to decrease, a negative direct voltage is produced at the output of unit 20, decreasing the flow of direct current through the glow tubes, thereby decreasing the high frequency capacitance provided by them and increasing the frequency of the oscillator controlled by tank circuit 26.

The response of the AFC circuit of this invention, containing as it does only electronic components, is extremely rapid. At the same time, it has been found that the effective frequency control range of the AFC circuit of Fig. 3 is quite large, being on the order of 1.5 megacycles, for example. With the feedback loop of Fig. 3, in fact, it is possible to so alter the reception frequency of the receiver, by alteration of the frequency of the local oscillator, as to maintain the reception of a carrier which is at first only approximately tuned in.

The arrangement of this invention is substantially independent of warm-up time of the receiver and of line voltage fluctuations and of changes in the B supply voltage of the receiver. It can be installed in the field if necessary and requires no unusual or special equipment or no new tube structures.

Due to the fact that, according to this invention, the variation of high frequency capacitance between the two principal electrodes of the glow discharge by the change in ion and electron density in the plasma between them, the plasma being regarded as a dielectric material, is of the order of several hundred per cent of the static capacitance, sweep searching of an oscillator frequency may be readily effected merely by applying appropriate sweeping direct voltages to the glow discharge device to vary the high frequency capacitance provided thereby through an appropriate range, the glow discharge device being connected to control the oscillator frequency in the manner disclosed previously. Thus, sweeping in an AFC circuit of a receiver may be easily effected. Again, this invention may be readily applied to provide sweep generators, such as those used for aligning filters and intermediate frequency amplifiers, replacing the cumbersome and expensive mechanical contrivances used heretofore to accomplish such sweeping. Also, frequency modulation of an oscillator may be carried out by applying appropriate modulating voltages to the glow discharge device to vary the high frequency capacitance provided thereby.

Figure 4:
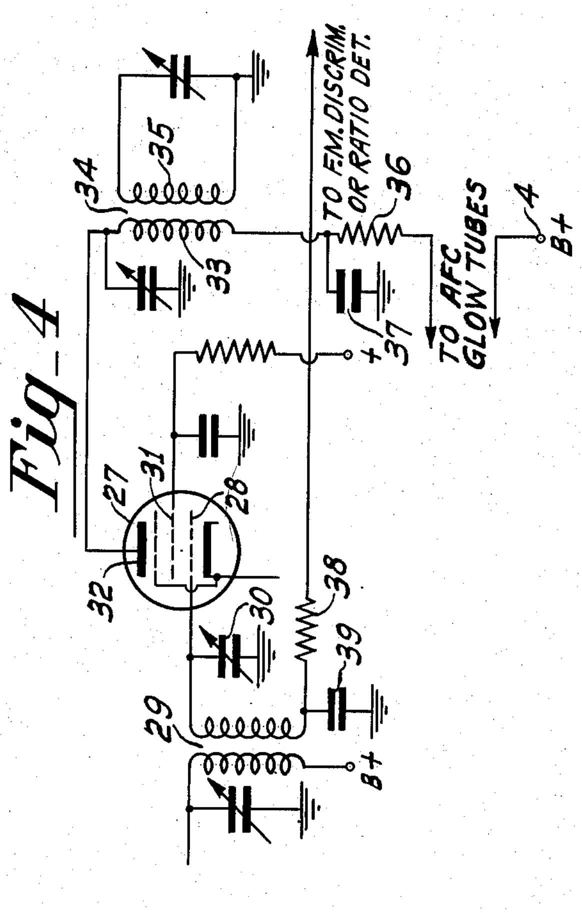
Fig. 4 is a modification of a portion of Fig. 3.

It is not absolutely necessary to provide an extra or additional tube, such as tube 18 of Fig. 3, for amplification of the direct voltage output of the discriminator unit 20, which voltage is used as a capacitance-controlling voltage for the glow tubes 11 and 14. Fig. 4 is a diagrammatic representation of a modified circuit in which an additional tube is not required. Tube 27 is a pentode and constitutes an I. F. amplifying stage having its control grid 28 supplied from the secondary of an I. F. transformer 29 which is tuned by a condenser 30. Screen grid 31 of pentode 27 is connected to a suitable positive potential source as shown, the usual dropping resistor and bypass condenser being provided as indicated. The anode 32 of tube 27 is coupled to supply amplified I. F. energy to the tuned primary 33 of an I. F. output transformer the secondary 35 of which is also tuned. The amplified I. F. output of tube 27 appears in secondary 35 and is applied to succeeding stages.

Anode 32 is supplied with potential from positive terminal 4 through a pair of series-connected glow tubes (not shown) such as 11 and 14 of Fig. 3 and a resistor 36 bypassed by a condenser 37. Thus, the direct current flowing in the anode-cathode path of tube 27 flows also in the gaseous discharge paths of the two glow tubes, and variations of direct current flow in tube 27 result in corresponding variations of the capacitance between the electrodes of the glow tubes. At the same time, tube 27 amplifies the I. F. signals in the conventional manner.

In order to vary the D. C. flow in tube 27, to thereby vary the D. C. flow through the glow tubes and thereby also their effective capacitance, or in order to amplify the D. C. output of the discriminator unit 20 before applying it to the glow tubes, a connection extends from the output of the discriminator, by way of a series resistor 38 and a shunt condenser 39, to the secondary of I. F. input transformer 29 and thereby also to grid 28. Direct voltages appearing in the discriminator output are thus applied to grid 28 to vary the grid bias of tube 27 and thereby also to vary the D. C. flowing through such tube and also through the glow tubes. Such direct voltages are subjected to amplification in the process.

The use of tube 27 as a D. C. amplifier for the AFC circuit does not interfere in any appreciable way with its use as an I. F. amplifier, said tube functioning in a more or less conventional way to amplify I. F. signals applied thereto from input transformer 29 and to apply such signals to output transformer 34. Therefore, by utilizing also as a D. C. amplifier for the AFC circuit an I. F. amplifier tube 27 already and normally present in the receiver, an extra or additional tube is not needed in Fig. 4 for D. C. amplification for the AFC arrangement.

What I claim to be my invention is as follows:

1. A variable high frequency capacitance circuit, comprising a gaseous discharge device having only two electrodes between which a glow discharge may occur, means for causing a flow of substantially unidirectional current between said two electrodes and through the gaseous medium to ionize said medium and establish a gaseous discharge in said device, means for varying the amount of current flowing between said two electrodes to vary the high frequency capacitance between said two electrodes, and means for connecting said two electrodes to a high frequency circuit for utilization of said high frequency capacitance.

2. A variable high frequency capacitance circuit, comprising a gaseous discharge device having only two electrodes between which a glow discharge may occur, means for connecting said two electrodes through a direct current blocking condenser to a high frequency circuit for utilization of the high frequency capacitance therebetween, a source of unidirectional current, means connecting one of said two electrodes to one terminal of said source and the other of said two electrodes through a high frequency choke to the other terminal of said source, whereby a flow of unidirectional current may be produced between said two electrodes and through the gaseous medium to ionize said medium and establish a gaseous discharge in said device, and means for varying the amount of current flowing between said two electrodes to vary said capacitance.

3. A variable high frequency capacitance circuit, comprising a pair of gaseous discharge devices each having only two electrodes between which a glow discharge may occur, a source of direct current, means connecting said two devices in series across said source, said source having a voltage such as to cause a flow of direct current through the series circuit including the said electrodes of said two devices to establish gaseous discharges in said devices, means for connecting the two directly-connected electrodes of the two devices through a direct current blocking condenser to a high frequency circuit, means grounding for high frequencies the other electrode of each device, said second-named means and said last-named means providing for utilization of the high frequency capacitance between said two directly-connected electrodes and ground, and means in circuit with said source and said two devices for varying the amount of direct current flowing through said series circuit including said electrodes to vary said capacitance.

4. A variable high frequency capacitance circuit, comprising a gaseous glow discharge device having a pair of electrodes between which a glow discharge may occur, means for causing a flow of substantially unidirectional current between said pair of electrodes and through the gaseous medium to ionize said medium and establish a glow discharge in said device, means responsive to the tuning of a high frequency oscillator for producing a control voltage proportional to the amount of mistuning of said oscillator, means responsive to said control voltage for varying the amount of current flowing through said device to vary the high frequency capacitance between said pair of electrodes, and means connecting said pair of electrodes to the frequency-controlling circuit of said oscillator to vary the output frequency of the same, by means of the variations in said capacitance, to alter the tuning of said oscillator to the proper output frequency.

5. A variable high frequency capacitance circuit, comprising a pair of gaseous discharge devices each having a pair of electrodes between which a discharge may occur, a source of direct current, means connecting said two devices in series across said source, said source having a voltage such as to cause a flow of direct current through the series circuit including said two devices to establish gaseous discharges in said devices, means for producing a control voltage, and means in circuit with said source and said two devices, said last-named means being responsive to said control voltage for varying the amount of direct current flowing through said series circuit to vary the high frequency capacitance between the two directly-connected electrodes of the two devices and one of the other electrodes.

6. A variable high frequency capacitance circuit, comprising a pair of gaseous glow discharge devices each having a pair of electrodes between which a glow discharge may occur, a source of substantially unidirectional current, means connecting said two devices in series across said source, said source having a voltage such as to cause a flow of current through the series circuit including said two devices to establish glow discharges in said devices, means coupling the two directly-connected electrodes of the two devices and one of the other electrodes to a high frequency circuit for utilization of the high frequency capacitance between the electrodes so coupled to such high frequency circuit, means for producing a control voltage, and means in circuit with said source and said two devices, said last-named means being responsive to said control voltage for varying the amount of current flowing through said series circuit to vary said capacitance and thereby to control said high frequency circuit.

7. A circuit as defined in claim 6, wherein the last-named means is connected in series with the source and the two devices and wherein said last-named means comprises the output electrode current path of an electron control device to the control electrode of which the control voltage is applied.

8. A variable high frequency capacitance circuit, comprising a pair of gaseous discharge devices each having a pair of electrodes between which a discharge may occur, a source of substantially unidirectional current, means connecting said two devices in series across said source, said source having a voltage such as to cause a flow of current through the series circuit including said two devices to establish gaseous discharges in said devices, means coupling the two directly-connected electrodes of the two devices and one of the other electrodes to the frequency-controlling circuit of a high frequency oscillator for utilization of the high frequency capacitance between the electrodes so coupled to said last-named circuit, means responsive to the tuning of said oscillator for producing a control voltage proportional to the amount of mistuning of said oscillator, and means in circuit with said source and said two devices, said last-named means being responsive to said control voltage for varying the amount of current flowing through said series circuit to vary said capacitance and thereby to vary the tuning of said oscillator to counteract its mistuning.

9. A circuit as defined in claim 8, wherein the last-named means is connected in series with the source and the two devices and wherein said last-named means comprises the output electrode current path of an electron control device to the control electrode of which the control voltage is applied.

10. A variable high frequency capacitance circuit, comprising a pair of gaseous glow discharge devices each having a pair of electrodes between which a glow discharge may occur, a source of direct current, means connecting said two devices in series across said source, said source having a voltage such as to cause a flow of direct current through the series circuit including said two devices to establish glow discharges in said devices, means coupling the two directly-connected electrodes of the two devices and one of the other electrodes to the frequency-controlling circuit of a high frequency heterodyning oscillator for utilization of the high frequency capacitance between the electrodes so coupled to said last-named circuit, discriminator means responsive to the tuning of said oscillator for producing a direct control voltage proportional to the amount of mistuning of said oscillator, and means in circuit with said source and with said two devices, said last-named means being responsive to said control voltage for varying the amount of direct current flowing through said series circuit to vary said capacitance and thereby to vary the tuning of said oscillator to counteract its mistuning.

WILLIAM H. CHERRY.

References Cited in the file of this patent

UNITED STATES PATENTS

| Number | Name | Date |
|---|---|---|
| 2,012,710 | Crosby | Aug. 27, 1935 |
| 2,032,620 | Langmuir | Mar. 3, 1936 |
| 2,033,231 | Crosby | Mar. 10, 1936 |
| 2,077,223 | Crosby | Apr. 13, 1937 |
| 2,407,424 | Hollingsworth | Sept. 10, 1946 |